United States Patent [19]

Jensen

[11] 4,043,319
[45] Aug. 23, 1977

[54] EXHAUST HOOD
[76] Inventor: Donald D. Jensen, 1141 Park Circle Drive, Fresno, Calif. 93727
[21] Appl. No.: 614,473
[22] Filed: Sept. 18, 1975
[51] Int. Cl.² .......................... F24C 15/20; F23J 11/00
[52] U.S. Cl. ........................... 126/299 D; 55/DIG. 36
[58] Field of Search ......... 98/115 K, 115 R, 115 LH, 98/58, 59, 60; 126/299 R, 299 B; 55/DIG. 36

[56] References Cited
U.S. PATENT DOCUMENTS

| | | | |
|---|---|---|---|
| 2,810,337 | 10/1957 | Samuelson et al. | 98/115 LH |
| 3,400,649 | 9/1968 | Jensen | 98/115 K |
| 3,530,784 | 9/1970 | Courchesne | 98/115 K |
| 3,645,194 | 2/1972 | Ahlrich | 98/115 K |
| 3,664,255 | 5/1972 | Kuechler | 98/115 K |
| 3,745,908 | 7/1973 | Mayberry | 98/115 LH |

Primary Examiner—Ronald C. Capossela
Attorney, Agent, or Firm—William C. Babcock

[57] ABSTRACT

An exhaust hood vented to the atmosphere comprising a double-walled stack and a double-walled hood structure where the gap between the walls of the stack and the hood are arranged for communication. A first blower is mounted on the exterior end of the stack for ingesting exterior air into the gap between the walls, with this ingested air flowing downwardly to be injected along the interior surfaces of the hood. A second blower is mounted in the stack for withdrawing the combination of the injected air and any fumes collected in said hood.

5 Claims, 5 Drawing Figures

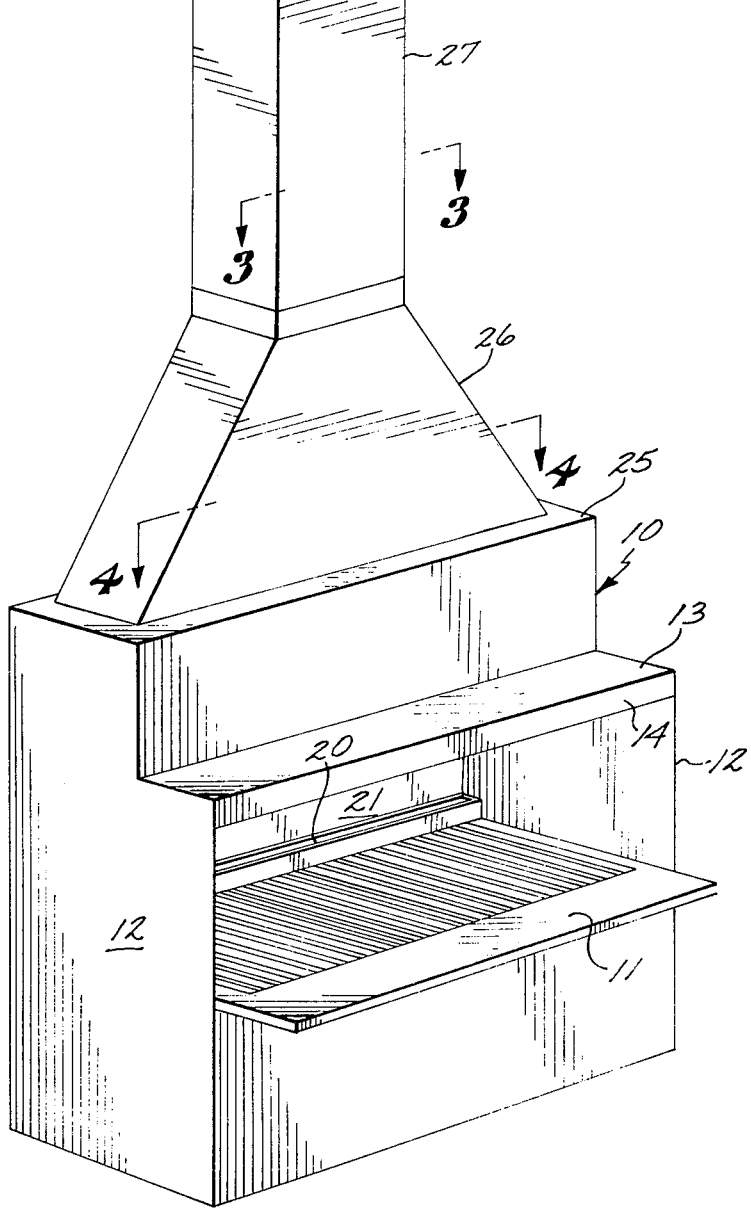
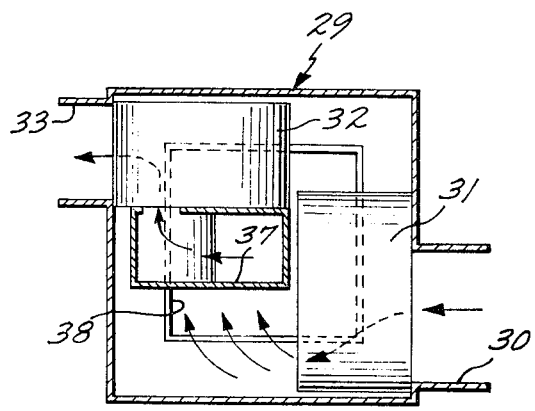
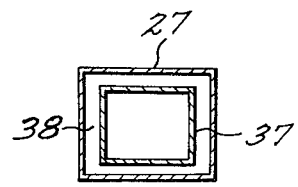
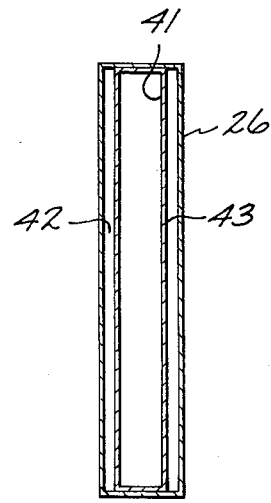

EXHAUST HOOD

BACKGROUND OF THE INVENTION

1. Field of the Invention

The present invention relates to cooking or fume generating surface exhausts, and more particularly to exhaust systems including boundary layer injection.

2. Description of the Prior Art

The use of exhausts to evacuate fumes developed over various fume-producing processes has been known in the past. Most typically, such exhausts are formed in the manner of range hoods which are either vented to the exterior of the home or filter the fumes and return the air back into the kitchen. Where large cooking facilities or other large fume-producing processes are involved and therefore large attendant volumes of associated fumes are formed, such as in restaurants and other commercial food dispensing facilities, the typical range hood or the exhaust system associated therewith incorporates blowers which evacuate the air below the range hood and exhaust such air into the exterior atmosphere.

Typically, such prior art exhaust systems rely on the natural convection currents of the warm fumes in order to direct the fumes into the hood area. Such arrangements, while adequate for non-commercial use, are not sufficiently effective in commercial food applications. More specifically, where commercial food production takes place, large quantities of ambient, tempored room are drawn from the kitchen thereby producing heavy air turbulence and drafts and also causing discomfort to employees working in the area. Accordingly, an exhaust system which does not efficiently evacuate all of the fumes associated with cooking both raises the temperature in the vicinity of the cooking range and therefore raises the attendant personal discomfort and furthermore allows a part of the fumes to bypass the hood or spill over into the working area. This continued accumulation of both heat and fumes within the working environment of hired personnel is then necessarily corrected by various air conditioning systems which are both expensive to install and require large amounts of power when in use.

An additional problem associated with conventional range hoods, whether adapted for commercial or for non-commercial use, is that large amounts of cooking vapors have a tendency to collect on the interior surfaces thereof to the point where eventually the collected matter reaches a point posing a real hazard of fire. More particularly, in the conventional convection flow range hoods most of the vapors or particulate matter collects on the interior surfaces of the hood closest to the cooking surface and an incident of fire on the range surface can ignite these deposits, which then can self-propagate the flame into the interior of the stack.

It is typically the feature of the thin-walled structure of the hood itself that is the most pronounced cause of such fires. Specifically, this thin-walled structure presents a low thermal mass and is therefore easily warmed up to a point above the combustion point of the deposits on the surface thereof. In the prior art the U.S. Pat. No. 3,400,649 dated Sept. 10, 1968, describes an exhaust system showing rear boundary air injection but does not show the more complete air injection system as set forth in the present application for patent.

SUMMARY OF THE INVENTION

Accordingly, it is the general purpose and object of the present invention to provide an exhaust system which includes means for injecting high velocity boundary layers over the interior surfaces thereof, and by a regulated injected flow of these air layers, the fumes are properly contained and the greater portion of replacement air that the exhaust hood needs for fume removal is furnished by this interior air injection. This then greatly reduces the surrounding air room loss by as much as 80 percent. Energy losses from either heating or cooling the replacement room air is reduced accordingly.

Other objects of the invention are to provide an exhaust system which includes double-walled surfaces as the functional elements thereof between which cool air is injected to maintain such surfaces below the combustion point of any collected particulate matter thereon.

Yet further objects of the invention are to incorporate an air injection system into an exhaust hood which, by virtue of its injected flow, limits the amount of particulate matter collected on the surfaces thereof.

These and other objects are accomplished within the present invention by providing a double-walled enclosure both in the exhaust stack structure and in the hood structure itself, the interior surfaces of such double-walled structure providing the containing walls for the fumes to be withdrawn by way of an exhaust fan or blower mounted on the end of the stack.

A second fan or blower also mounted on the stack but on a surface opposed to the exit of the exhaust fan draws exterior air into the cavity between the double walls, forcing such air downwardly along the stack and into the hood structure from where it is injected as a high velocity boundary layer stream along the interior surface of the hood by way of a peripheral injection slot. Similarly the back wall or the splash wall along the cooking surface is also formed as a double-walled structure, again terminating in injection slots adjacent the cooling surface. The alignment of the peripheral injection slot and the injection slot along the back wall directs the high velocity exterior air flow along the interior back wall surface and along the interior surfaces of the hood. This high velocity boundary layer stream carries along with it the vapors and fumes developed at the cooking surface by what is conventionally referred to as the Venturi action associated with fluid flow. The interior hood surface is furthermore convolved to provide a sharp edge divergent break point at which the high velocity boundary layer stream issued from the peripheral slot separates from the hood surface to trap a vortex thereat, which by virtue of its circulation, directs the major part of the vapors into a filter at the inlet of the stack. Similarly, the interior back wall surface includes a projecting ledge or trap disposed horizontally thereacross which functions both to trap any grease accumulate draining from the filter and to fix yet another vortex, which by virtue of its circulation again directs the flow towards the center of the filter. The filters themselves are conventional in their structure, removing both the particulate and the vapor matter from the combined gas flow and allowing the residual gases to the interior of the stack from where they are withdrawn by the exhaust fan.

To accommodate for various thermal gradients between the room and the air column immediately above the cooking surface, and therefore the associated convective currents, the interior cavity or interwall gap of the hood structure includes a butterfly valve disposed transversely thereacross, which by selective manipulation, can be adjusted to provide more or less air flow through the peripheral slot. Thus, as the convection currents either increase or decrease in strength, the amount of assistance in trapping the fumes within the hood enclosure itself can be provided by selective articulation of the butterfly valve.

It is to be noted that there are two distinct air layers flowing over the interior hood surfaces toward the exhaust opening. The replacement air flowing up the back wall is the major air supply flowing with a velocity great enough to draw, by venturi action, all generated fumes into it and its velocity must be sufficient to reach the exhaust opening before the front peripheral air stream. The peripheral air serves as an auxilliary air stream to redirect any fumes being forced from the hood by the back wall air stream. The peripheral air also helps reduce ambient air room loss adjacent to the hood.

It should be noted that the front peripheral air stream would be entirely ineffective if it were not operating in conjunction with the rear air stream. The reason for this is that if only peripheral air were injected into the hood this air stream would rush into the exhaust system before the contaminated fumes from below could reach this area. This air would short circuit the exhaust system as it would add fresh clean air into the system before the contaminated fumes from below could reach this area.

This arrangement for injecting cool exterior air into the convective current above the cooking surface, both provides cooling of the structure, and furthermore cools the gas fumes to permit easier and therefore more effective vapor condensation at the filters.

BRIEF DESCRIPTION OF THE DRAWING

FIG. 1 is a perspective illustration of an inventive range hood mounted over a cooking surface;

FIGS. 2, 3, and 4 are sectional views, taken along lines 2—2, 3—3 and 4—4 of FIG. 1, respectively.

DESCRIPTION OF THE SPECIFIC EMBODIMENT

Figure 5:
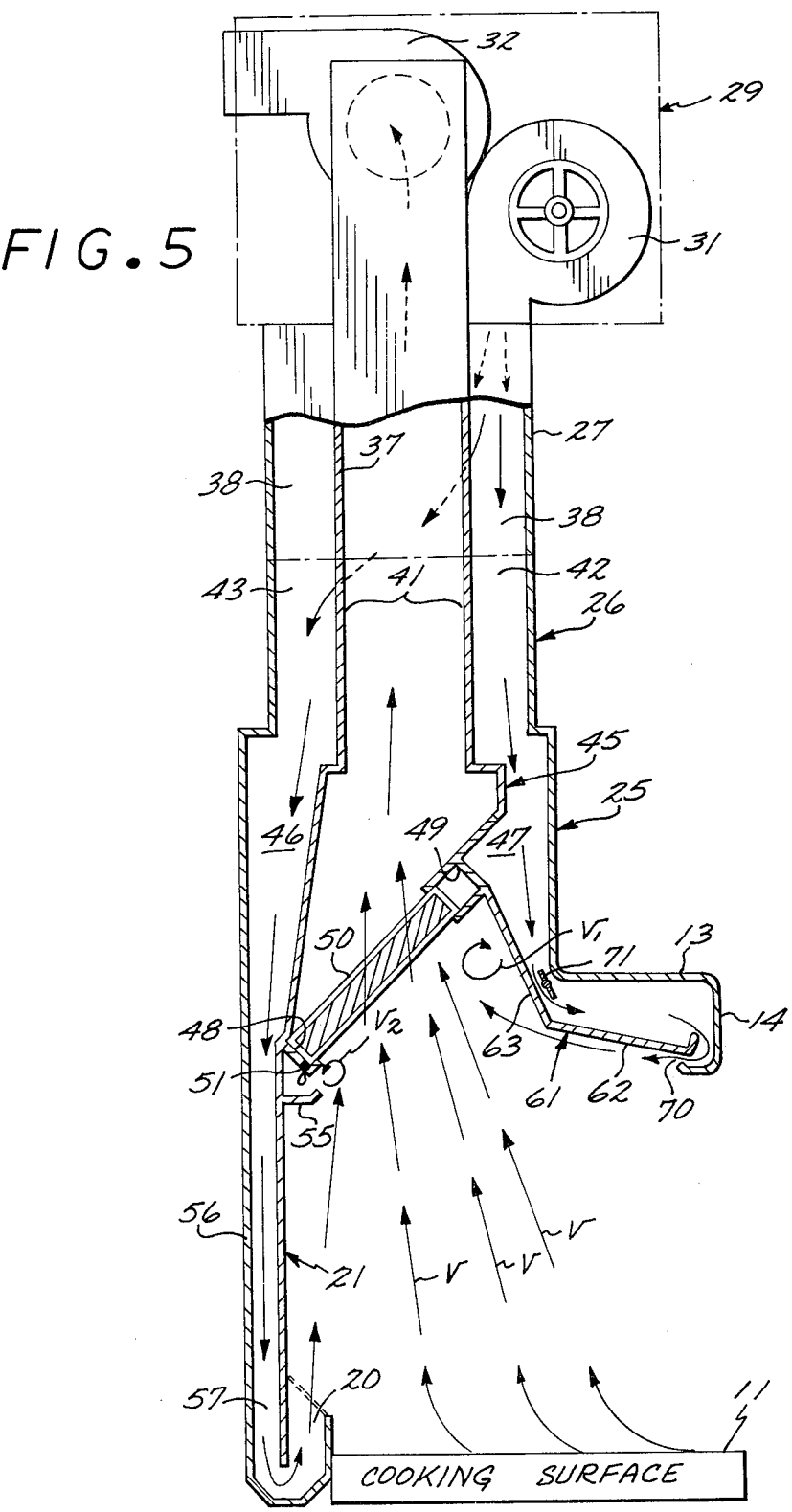
FIG. 5 is a side view in partial cross section of the inventive exhaust hood illustrated in FIG. 1.

While the present teachings are directed at a range hood or a hood associated with a cooking surface, such is for purposes of illustration only. It is contemplated that the general configuration taught hereinbelow can be associated with many other fume-producing processes, and no intent to limit the scope thereof is expressed hereby.

As shown in FIG. 1, an inventive exhaust hood generally designated by the numeral 10 is disposed over a grille or a cooking surface 11 which is enclosed between two vertical side walls 12 supporting the exhaust hood over the grille. Along its lower surface, exhaust hood 10 includes an exteriorily projecting hood surface 13, which at its free transverse edge, terminates in a downwardly turned lip 14. By way of this arrangement a rectangular access opening is formed bounded by walls 12 on either side and enclosed on the upper surface by the hood surface 13 and the lip 14. This access opening allows manual manipulations to be performed during cooking of any food articles on the grille 11. It is through this opening that the prior art range hood most often allowed the escape of cooking fumes developed at the grille, with the attendant in increase in heat and contamination of the working area.

To avoid this problem, a transverse slot or opening 20 is provided along the interior transverse edge of the grille 11, extending between the walls 12. The orientation of slot 20 is aligned to inject a stream of air along the interior surface of a vertical back plate 21, again disposed between walls 12 to enclose the rear of the cooking cavity. A similar slot or peripheral opening is provided on the interior side of lip 14, the configuration thereof to be described in more detail herein below.

It is contemplated within the present invention to inject a stream of cool, high velocity air through slot 20 and the peripheral slot to thereby generate a high velocity boundary layer along the back wall 21 and along the underside of the hood. Joined to the rear transverse edge of the hood surface 13 and extending between walls 12 is a rectangular, vertically aligned enclosure 25 which at the upper surface thereof joins with a tapered adaptor 26, joining at its upper end a rectangular vertical stack 27. Stack 27 extends to the exterior of the structure enclosing the work area, shown by way of a roof section 28, to terminate within a rectangular housing 29 on the exterior thereof. Shown on the forward surface of housing 29 is a hooded opening 30 through which according to means further described, exterior air is ingested into selected cavities of hood 10.

As shown in more detail in FIG. 2, the rectangular housing 29 includes a blower 31 having the inlet thereof mounted within the opening 30. Yet another blower 32 is provided within the housing 29, blower 32 exhausting through an aperture 33 on the side opposed to inlet 30. The inlet side of blower 32 is in turn connected to a rectangular duct 37, centrally disposed within stack 27 to define a peripheral cavity 38 therebetween. Cavity 38 communicates with the interior of housing 29, thus permitting the exhaust side of blower 31 to insert cool air into the interior thereof.

As shown in FIG. 3, stack 27, in section, includes a double-walled structure, enclosing the peripheral cavity 38 between the exterior surface of stack 27 and the centrally disposed duct 37. Similarly shown in FIG. 4, the interior configuration of adapter 26 includes an interior rectangular section 41 conformed to the taper of adaptor 26 to provide two cavities 42 and 43 along the front and rear surfaces thereof. Cavities 42 and 43 are joined to communicate with the peripheral cavity 37 thus allowing for the passage of the ingested cool air therethrough.

Referring now to FIG. 5, blower 31 is shown ingesting cool air from the exterior of housing 29 into the peripheral cavity 38. Cavity 38 in turn communicates with both cavities 42 and 43, which in turn exhaust into the interior of the vertical enclosure 25. Disposed within the interior of the enclosure 25 and communicating with the lower end of the interior section 41 is a filter shell 45 again providing a front and back interior cavity 46 and 47, respectively, between the interior surfaces of enclosure 25 and the exterior thereof. At its lower edge filter shell 45 terminates at the back surface thereof in a transversely aligned filter receiving channel 48, which in section, is disposed on a downwardly receiving slope in opposing relationship with an upper filter receiving channel 49 disposed on the front lower edge of shell 45. The opposed channels 48 and 49 are separated to allow insertion therebetween of a filter 50 such as the air cleansing unit described in my prior U.S. Pat. No. 3,813,856. The vertical arrangement of channels 48 and 49 is such that filter 50 is disposed in a downwardly sloping plane towards the rear of hood 10, to drain any vapor condensate into channel 48. Channel 48 therefore includes an opening 51 formed therethrough to allow for the drainage of the condensate therein into a transverse trap 55 formed on the interior surface of the back plate or back wall 21. Extending exteriorily along the back wall 21 and separated by a gap therefrom is an exterior rear surface 56 forming a common plane with the rear surface of the rectangular enclosure 25. The surface of back wall 21 and the exterior surface 56 forms yet another cavity 57 therebetween, communicating with cavity 46. The lower edge of the exterior surface 56 is turned to surround the lower edge of the backwall 21, thus forming the aforementioned slot 20 along the interior edge of the grill surface 11.

In a similar manner an interior hood shell 61 is disposed within the common interior of enclosure 25 and the hood surface 13. More specifically, shell 61 comprises a front planar member 61 and a rear planar member 63 disposed between walls 12, members 62 and 63 forming a common joint. The distal transverse edge of planar member 63 in turn connects to the transverse channel 49. The angular arrangement of members 62 and 63 is such that members 63 is sloped more towards the vertical, while member 62 is aligned more closely with the horizontal. This angular arrangement of the planar members provides for a divergent break point at the common joint thereof, whereby any boundary stream along the exterior surface of member 62 is induced to separate from the surface of member 63. To provide for such a boundary flow, the free edge of member 62 is surrounded by the lip 14 which in turn is convolved on the lower edge thereof around member 62 to form a peripheral slot 70. Thus, a second confined passageway is formed between members 62 and 63 and the surface of enclosure 25 and hood surface 13 through which the air ingested by the blower 31 is conveyed into the peripheral slot 70.

This arrangement of parts allows for a controlled flow distribution within the hood 10 where the injected boundary flow along wall 21 is at a higher velocity than the injected flow from slot 70. The resulting venturi effect, according to principles set forth by Bernoulli, will produce lower static pressures along the boundary stream from slot 70, drawing most of the vapors towards the back wall 21.

To provide for further control over the flow through slot 70, a butterfly valve 71 is disposed for rotation between the planar member 63 and the joint between surface 13 and enclosure 25. Thus, by selective rotation of valve 71 the air injected through blower 31 can be controlled in distribution between slots 20 and 70.

The operation of the present invention will now be taken up, with particular reference with FIG. 5. During the process of cooking on the cooking surface or grille 11, vapors shown as vapors V are developed and are drawn across the filter 50 by the exhaust fan 32. Concurrently, blower 31 injests exterior air into the cavities 38, 42, 43 and through cavity 47 to the peripheral slot 70. This injected air is then injected as a high velocity boundary stream along the planar member 62. At the break point, formed by the joint between members 62 and 63, this high velocity boundary stream as induced by the high velocity rear stream to separate, and the projection of channel 49 traps a vortex $V_1$ along the surface of member 63. The circulation of vortex $V_1$ in combination with the higher velocity region along the back wall directs the vapor stream V into the central portion of the filter 50. Similarly, slot 20 injects the high velocity boundary stream along the interior surface of wall 21 which separates at the free end of trap 55 forms yet another transverse vortex $V_2$. Vortex $V_2$ in a similar manner directs the vapor flow towards the center of filter 50. Vortices $V_1$ and $V_2$ cooperate to direct the higher volumetric flow to be from slot 20 into the filter 50. Thus, very or no residual fumes escape from the hood into the working area. Specifically, by way of this flow arrangement the heavier particles or vapors associated with any food production will migrate towards exterior edges of vortices $V_1$ and $V_2$. Thus, the heavy particles will therefore align better within the filter 50 and will therefore deposit with less frequency on the interior surfaces of the hood. In addition, the ingested flow is passed along the surfaces of the hood exposed to heat, thus cooling those surfaces to both cool the vapors for easier condensation and to reduce the possibility of fire.

Some of the many advantages of the present invention should now be readily apparent. The invention provides by way of a convenient arrangement of parts, an exhaust hood which furnishes the greater portion of needed replacement air within the hood itself; and, this air flow also cools and limits the deposits of vapor condensate on the surface of the hood.

Obviously, many modifications and variations of the present invention will be apparent to those skilled in the art. It is therefore intended that the scope of the invention be solely limited by the claims appended hereto.

I claim:

1. In combination with a hot cooking surface that has a forward and a rearward edge and from which surface fumes arise; a roof that is disposed above said cooking surface; first and second power-driven blowers mounted on said roof, each of said blowers including an air inlet opening and an air discharge opening; a stack that depends from said roof; a hood disposed above said cooking surface, said hood defined by a pair of side walls, a forwardly disposed portion, and rearward surface defining means, a fume control assembly, said fume control assembly including:
   a. a duct longitudinally disposed in said stack and cooperating therewith to define a forward and rearward vertically extending cavity, said duct supported in a fixed position relative to said stack, said first and second cavities in communication with said discharge outlet of said first first blower, and said duct in communication with said air inlet opening of said second blower;
   b. an air cleansing assembly operatively associated with said duct, said air cleansing assembly removing grease from said fumes as the latter move upwardly therethrough;
   c. a back wall that extends downwardly from said duct, said back wall cooperating with said rearward surface defining means to define a first vertical cavity in communication with said rearward cavity, and an upwardly directed elongate first opening longitudinally disposed relative to said rearward edge of said hot cooking surface and adjacent thereto; and
   d. a downwardly and outwardly directed wall supported from said duct, said wall cooperating with said forward portion to define a second cavity and an inwardly directed second opening, said second cavity in communication with said forward cavity, said first blower when operating concurrently discharging air to said forward and rearward cavities for air to discharge concurrently from said first and second openings as first and second streams thereof, said first stream discharging upwardly and forwardly of said back wall at a sufficient velocity as to create a negative pressure zone adjacent thereto to draw said fumes rearwardly and upwardly across said cooking surface to subsequently discharge through said air cleaning assembly, said second stream discharging rearwardly at an angle to said first stream to direct any fumes arising from said cooking surface not already moving upwardly and rearwardly in a rearwardly moving direction to mix with said first stream and subsequently flow through said air cleansing assembly, and said second blower when operating maintaining a negative air pressure in said duct above said air cleaning assembly to encourage the flow of said first and second streams mixed with said fumes through said air cleaning assembly to remove a substantial quantity of grease therefrom prior to the air in said duct being discharged through said air discharge outlet of said second blower.

2. The fume control assembly as defined in claim 1 which in addition includes:
 e. manually operated valve means adjacent said second opening for controlling said second stream to a desired velocity relative to said first stream.

3. The fume control assembly as defined in claim 1 in which said first blower is of sufficient capacity as to provide air to said first and second streams in sufficient volume to maintain the interior surfaces of said duct and hood at a temperature below that at which grease will ignite.

4. The fume control assembly as defined in claim 1 in which said first blower is of sufficient capacity as to provide air to said first and second streams in sufficient volume as to cool said fumes to the extent that grease therein will tend to solidify and be retained in said air cleaning assembly.

5. The fume control assembly as defined in claim 1 in which said wall is defined by a first outwardly disposed section and an inwardly disposed section that are so angularly positioned relative to one another that said second stream forms a vortex adjacent said second section that directs said fumes entrapped therein into substantially the center of said air cleaning assembly.

* * * * *